(12) United States Patent
Tagaya (10) Patent No.: US 9,081,673 B2
(45) Date of Patent: Jul. 14, 2015

(54) MICROPROCESSOR AND MEMORY ACCESS METHOD

(75) Inventor: Satoru Tagaya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 691 days.

(21) Appl. No.: 13/407,316

(22) Filed: Feb. 28, 2012

(65) Prior Publication Data

US 2012/0254530 A1 Oct. 4, 2012

(30) Foreign Application Priority Data

Mar. 30, 2011 (JP) .................................. 2011-075138

(51) Int. Cl.
*G06F 12/06* (2006.01)
*G06F 12/08* (2006.01)
*G06F 12/00* (2006.01)
*G06F 13/16* (2006.01)

(52) U.S. Cl.
CPC ................ *G06F 12/06* (2013.01); *G06F 12/08* (2013.01); *G06F 13/16* (2013.01)

(58) Field of Classification Search
CPC ..... G06F 12/00; G06F 12/06; G06F 11/1008; G06F 12/0868; G06F 12/1458; G06F 17/30038; G06F 21/53; G06F 2221/2149; G06F 3/061; G06F 3/0644; G06F 3/1236; G06F 12/0246; G06F 12/0804; G06F 12/0862; G06F 13/16; G06F 13/28; G06F 1/3203; G06F 3/0637; G06F 3/0659; G06F 11/2071; G06F 11/349; G06F 12/0842; G06F 17/30982; G06F 1/3225; G06F 1/3275; G06F 3/0629; G06F 3/1279; G06F 9/30145; G06F 9/3885; G06F 9/3897

USPC ............ 711/E12.001, E12.02, 105, 125, 154, 711/E12.002, E12.084
See application file for complete search history.

(56) References Cited

U.S. PATENT DOCUMENTS

| | | | | |
|---|---|---|---|---|
| 5,623,622 | A | * | 4/1997 | Yuki et al. ..................... 711/100 |
| 5,642,499 | A | * | 6/1997 | Ohba et al. .................... 712/228 |
| 6,260,101 | B1 | * | 7/2001 | Hansen et al. ..................... 711/5 |
| 7,380,045 | B2 | * | 5/2008 | Park et al. ..................... 710/315 |
| 7,650,469 | B2 | * | 1/2010 | Dyck et al. .................... 711/152 |
| 2010/0146199 | A1 | * | 6/2010 | Shaeffer et al. ............... 711/105 |
| 2012/0151232 | A1 | * | 6/2012 | Fish, III ........................ 713/322 |

FOREIGN PATENT DOCUMENTS

| | | |
|---|---|---|
| JP | 2002-366425 A | 12/2002 |
| JP | 2004-326543 A | 11/2004 |

(Continued)

OTHER PUBLICATIONS

Communication dated Aug. 26, 2014, issued by the Japanese Patent Office in corresponding Application No. 2011-075138.

*Primary Examiner* — Yong Choe
*Assistant Examiner* — Edward Waddy, Jr.
(74) *Attorney, Agent, or Firm* — Sughrue Mion, PLLC (57) ABSTRACT

A microprocessor according to the present invention includes instruction execution unit that executes an instruction to output an access request to a memory according to a first protocol; memory control unit that converts the access request according to the first protocol to an access request according to a second protocol to perform an access control to an external memory to output the access request; selection unit that selects whether to access the external memory using the memory control unit; and interface unit that externally outputs one of the access request according to the first protocol and the access request according to the second protocol based on the selection result in the selection unit.

10 Claims, 8 Drawing Sheets

(56) References Cited

FOREIGN PATENT DOCUMENTS

| JP | 2005-258874 A | 9/2005 |
| JP | 2006-293591 A | 10/2006 |
| JP | 2008-129616 A | 6/2008 |
| JP | 2009-026269 A | 2/2009 |
| JP | 2009-086830 A | 4/2009 |
| JP | 2011-048624 A | 3/2011 |

* cited by examiner

MICROPROCESSOR AND MEMORY ACCESS METHOD

INCORPORATION BY REFERENCE

This application is based upon and claims the benefit of priority from Japanese patent application No. 2011-075138, filed on Mar. 30, 2011, the disclosure of which is incorporated herein in its entirety by reference.

BACKGROUND OF THE INVENTION

1. Field of the Invention

The present invention relates to a microprocessor used in a computer system and a memory access method using the microprocessor, and more specifically, to a microprocessor and a memory access method using the same with improved connection flexibility of a memory to be connected.

2. Description of Related Art

In recent years, there have been increasing demands for improving connection flexibility of an external memory connected to a microprocessor or sharing the external memory by a plurality of semiconductor devices in order to construct a computer system with higher flexibility.

Japanese Unexamined Patent Application Publication No. 2006-293591 discloses a system in which a plurality of semiconductor devices share an external memory without a connection of a system bus. This system includes an external memory and a plurality of semiconductor devices, and an interface unit that behaves like an external memory is additionally provided in a first semiconductor device. The interface unit receives a memory control signal output from a memory controller in a second semiconductor device, and transmits an access request to the external memory to the memory controller in the first semiconductor device. Upon receiving the access request, the memory controller in the first semiconductor device outputs a memory control signal to the external memory to access data. According to the system configuration, the plurality of semiconductor devices may share the external memory, and there is no need to include an external memory for each semiconductor device, resulting in cost reduction.

Further, Japanese Unexamined Patent Application Publication No. 2008-129616 discloses a memory control system that allows a memory controller to control an external memory by newly providing a data transfer control apparatus between a memory controller and an external memory even when the external memory employs a different transfer system. The data transfer control apparatus absorbs the difference in the specifications of transfer systems including an SDR transfer system, a DDR transfer system, a bus width doubling transfer system, which allows the memory controller to appropriately control the external memory.

SUMMARY

It is required in the memory interface used in an existing Double Data Rate (DDR) system that turn around time (TAT) from the memory controller to a dynamic random access memory (DRAM) which is an external memory is a specified delay. Accordingly, it is difficult to provide a network fabric which may vary the delay between the external memory and the memory controller arranged inside the microprocessor.

This means that it is difficult to satisfy the requirements to flexibly form a shared memory system or a distribution memory system according to users or to dramatically increase capacity of memories that can be mounted using the existing memory interface. In order to satisfy these requirements, the number of memory controllers or its configuration provided inside the microprocessor needs to be changed, which requires changes of the design of the microprocessor itself according to the requirement by the user. These problems cannot be solved using the techniques disclosed in Japanese Unexamined Patent Application Publication No. 2006-293591 and Japanese Unexamined Patent Application Publication No. 2008-129616 stated above. Thus, a new technique needs to be developed.

The present invention has been made in view of the problems stated above, and aims to provide a microprocessor and a memory access method using the same that are capable of flexibly changing capacity and configurations of an external memory connected thereto without changing the design of the microprocessor itself.

A first exemplary aspect of the present invention is a microprocessor including: an instruction execution unit that executes an instruction to output an access request to a memory according to a first protocol; a memory control unit that converts the access request according to the first protocol to an access request according to a second protocol to perform an access control to an external memory to output the access request; a selection unit that selects whether to access the external memory using the memory control unit; and an interface unit that externally outputs one of the access request according to the first protocol and the access request according to the second protocol based on the selection result in the selection unit.

A second exemplary aspect of the present invention is a memory access method used by a microprocessor including a memory control unit that performs an access control to an external memory, the method including: a setting step that sets whether to use the memory control unit; an instruction execution step that executes an instruction to output an access request to a memory according to a first protocol; a conversion step that converts the access request according to the first protocol to an access request according to a second protocol to perform the access control to the external memory when it is set in the setting step that the memory control unit is used, and does not perform the conversion when it is set in the setting step that the memory control unit is not used; and an output step that selects one of the access request according to the first protocol and the access request according to the second protocol to externally output the selected one.

According to the configuration of the present invention, it is possible to provide a microprocessor and a memory access method using the same that are capable of flexibly changing capacity and configurations of an external memory connected thereto without changing the design of the microprocessor itself.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENTS

First Exemplary Embodiment

Figure 1:
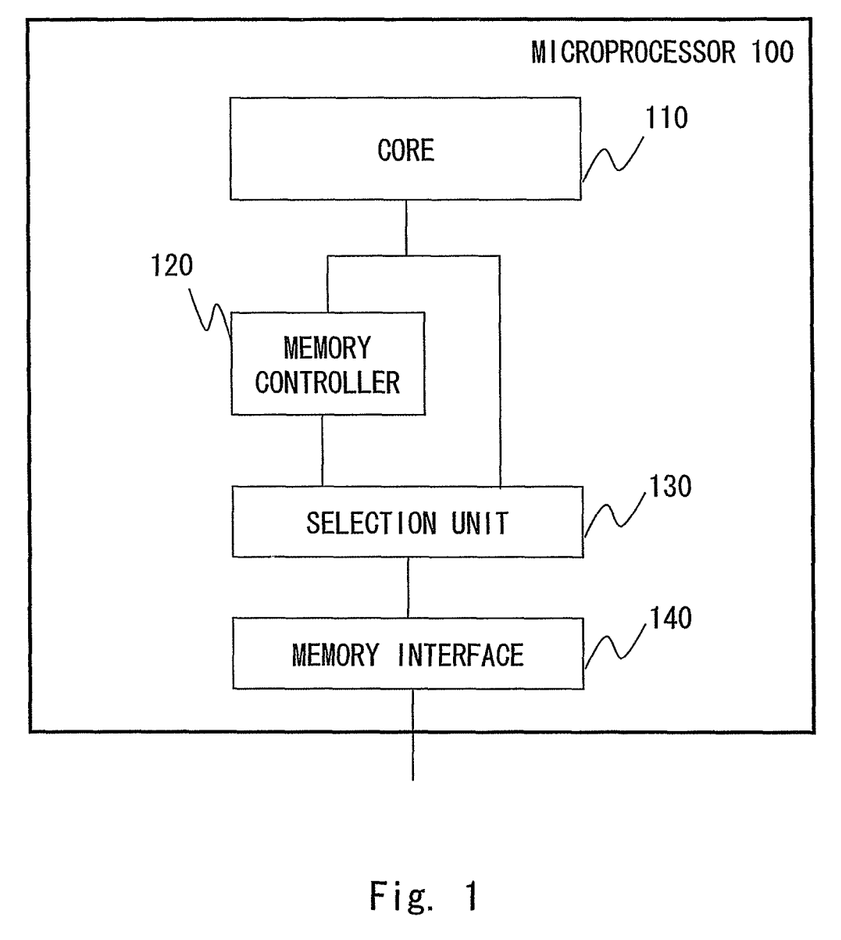
FIG. 1 is a block diagram of a microprocessor according to a first exemplary embodiment.

Hereinafter, exemplary embodiments of the present invention will be described with reference to the drawings. FIG. 1 is a block diagram showing a configuration of a microprocessor 100 according to a first exemplary embodiment.

The microprocessor 100 is also called a central processing unit (CPU) in general, and includes a core 110, a memory controller 120, a selection unit 130, and a memory interface 140 therein. Hereinafter, each block will be described.

The core 110 decodes an instruction that is fetched, and performs various controls and operation processing according to the content of the instruction. For example, when the decoded instruction is a load instruction, the core 110 outputs a data reading request to read out data from a memory. Further, when the decoded instruction is a store instruction, the core 110 outputs a data writing request to write data into the memory. Hereinafter, the data reading request and the data writing request are collectively called an access request. The core 110 executes the load/store instructions, thereby outputting the access request to the memory according to a first protocol.

The memory controller 120 performs an access control to an external memory connected to the memory interface 140 according to a predetermined protocol. The external memory connected to the memory interface 140 may be a Synchronous Dynamic Random Access Memory (SDRAM), for example. The standard of the memory includes DDR, DDR2, DDR3, DDR4; however, it is not limited thereto. Memories according to various specifications that will be standardized in the future may be employed. The memory controller 120 receives an access request output from the core 110, and outputs an access request according to a predetermined protocol corresponding to the external memory connected to the memory interface 140. In summary, the memory controller 120 receives the access request according to the first protocol, converts the access request to an access request according to a second protocol to perform an access control to the external memory, and outputs the access request.

The selection unit 130 selects whether to access the external memory using the memory controller 120. The selection unit 130 selects one of the access request according to the first protocol output from the core 110 and the access request according to the second protocol output from the memory controller 120 to output the selected one to the memory interface 140. More specifically, the selection unit 130 selects one of the core 110 and the memory controller 120 as a connection destination of the memory interface 140. Specifically, when accessing the external memory using the memory controller 120, the selection unit 130 connects an input/output of the memory controller 120 and the memory interface 140. On the other hand, when the access request output from the core 110 is directly output to outside without the use of the memory controller 120, the selection unit 130 connects an input/output of the core 110 and the memory interface 140. When the selection unit 130 connects the memory interface 140 and the core 110, a relay apparatus or the like including the memory controller is connected to the memory interface 140. The access request output from the core 110 is input to the memory controller inside the relay apparatus through the selection unit 130 and the memory interface 140, and the memory controller performs the access control to the external memory.

The memory interface 140 is an interface to connect the microprocessor 100 and the external memory, and its specification is specified according to the external memory that is directly connected thereto. When the external memory connected to the memory interface 140 employs a DDR system, the memory interface 140 is a so-called DDR interface. The memory interface 140 is electrically specified according to the standard including DDR, DDR2, DDR3, and DDR4. The memory interface 140 is connected to the selection unit 130, outputs a signal received from the selection unit 130 to outside, and outputs a signal input from outside to the selection unit 130. Accordingly, the memory interface 140 externally outputs one of the access request according to the first protocol and the access request according to the second protocol which is selected by the selection unit 130.

As described above, according to the microprocessor of the first exemplary embodiment, it is possible to select whether to directly access the external memory using a memory controller that is provided inside or to externally output the access request according to a predetermined communication protocol without using the memory controller. Further, by selectively switching the connection destination of the memory interface by the selection unit, it is possible to externally output one of the access request output through the memory controller and the access request output without passing through the memory controller through a common memory interface.

In other words, the microprocessor according to the first exemplary embodiment first performs a series of operations of fetching, decoding, executing load/store instructions in a core and outputting an access request to a memory. Upon receiving the access request according to a first procedure, the memory controller converts an access request to an access request according to a second procedure, and outputs the access request to perform an access control to an external memory. The electrical specification and the operation procedure of the access request according to the second procedure are typically specified by a standard for the standardization of the external memory and the memory controller. The microprocessor according to the present invention includes a selection unit that selects whether to access the external memory using the memory controller. One of the access request according to the first procedure and the access request according to the second procedure is externally output through an interface unit based on the selection result in the selection unit. From the configuration above, the memory configuration may be changed without changing the design of the microprocessor itself.

Figure 2:
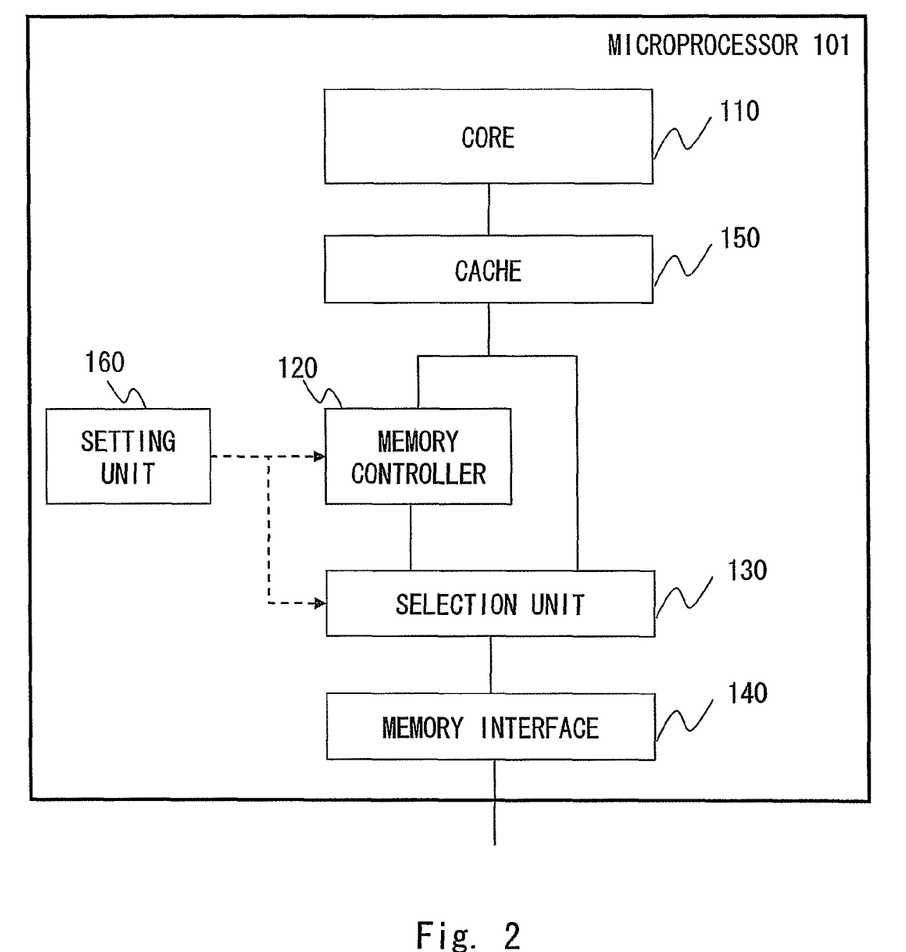
FIG. 2 is a block diagram of another form of the microprocessor according to the first exemplary embodiment.

Note that, as shown in FIG. 2, a cache 150 may be additionally provided between the core 110 and the memory controller 120. The cache 150 includes a cache memory for temporarily storing data which is frequently accessed by the core 110. A cache control unit inside the cache 150 performs cache hit/miss determination based on the access request that is input, and performs a control to read out required data from the cache memory or a control to write required data into the cache memory as needed. The cache control unit outputs the data that is read out to the core 110. When the required data is not stored in the cache memory, the cache control unit outputs the access request to the memory controller 120 and the selection unit 130. The cache 150 may be an L1 cache or an L2 cache. Further, the cache 150 may be a higher-level cache, or may be a hierarchy of a plurality of caches.

Further, as shown in FIG. 2, a setting unit 160 may be additionally provided. The setting unit 160 refers to setting information regarding whether to use the memory controller 120 to set the memory controller 120 and the selection unit 130. For example, when the content of the above setting information indicates that the memory controller 120 is not used, the setting unit 160 performs setting to stop functions of the memory controller 120. Thus, the setting unit 160 outputs a control signal to stop the functions of the memory controller 120 to the memory controller 120. Upon receiving the control signal, the memory controller 120 stops the functions. The above configuration leads to reduction in power consumption.

Further, the setting unit 160 outputs the control signal to the selection unit 130. The selection unit 130 connects one of the memory controller 120 and the cache 150 to the memory interface 140 based on the control signal that is received. For example, when the content of the above setting information indicates that the memory controller 120 is not used, the setting unit 160 performs setting so that the selection unit 130 connects the memory interface 140 and the cache 150. In short, the setting unit 160 outputs the control signal to connect the memory interface 140 and the cache 150 to the selection unit 130. In this way, the connection destination in the selection unit 130 may be selectively switched based on the control signal input from the setting unit 160.

Further, the setting unit 160 may output the above control signal to the cache 150. The cache 150 may output the access request to one of the memory controller 120 and the selection unit 130 based on the control signal input from the setting unit 160.

Figure 3:
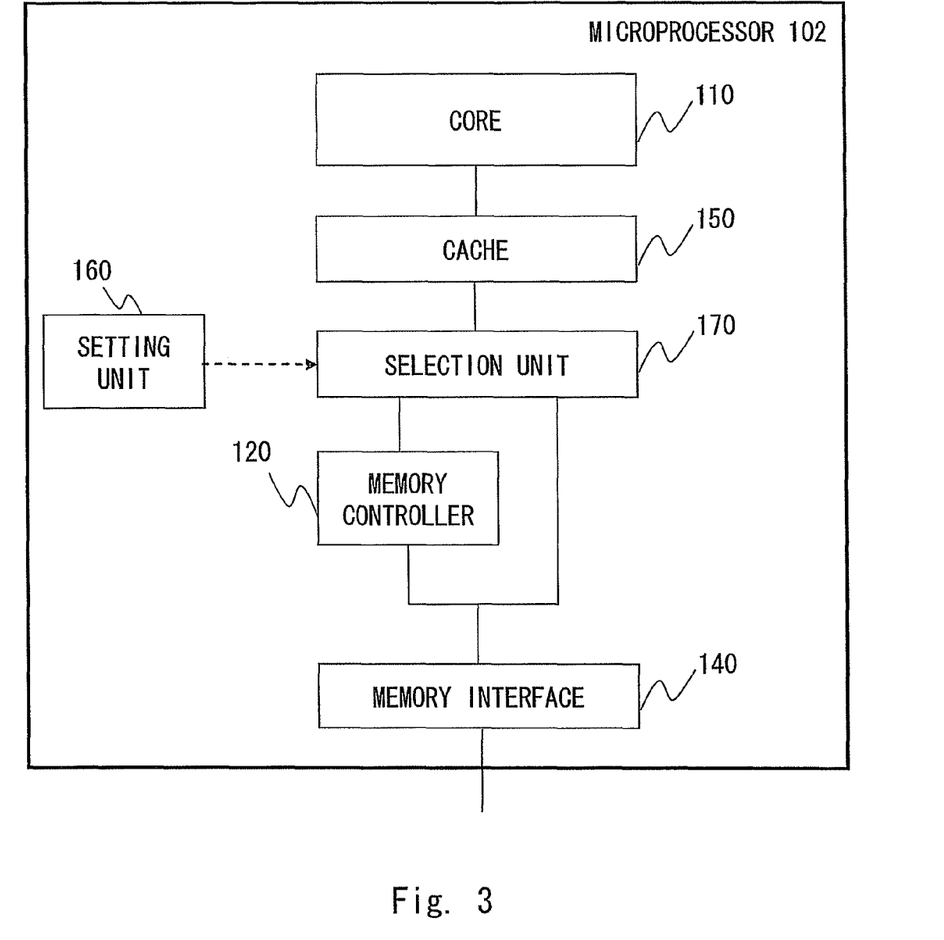
FIG. 3 is a block diagram of another form of the microprocessor according to the first exemplary embodiment.

Further, as shown in FIG. 3, a selection unit 170 may be arranged between the cache 150 and the memory controller 120. The access request according to the first protocol output from the cache 150 is input to the selection unit 170. The selection unit 170 outputs the access request according to the first protocol that is received to one of the memory controller 120 and the memory interface 140 based on the above setting performed by the setting unit 160. Upon receiving the access request according to the first protocol from the selection unit 170, the memory controller 120 converts the received access request to an access request according to the second protocol to perform the access control to the external memory to output the access request to the memory interface 140. The memory interface 140 outputs one of the access request according to the first protocol output from the selection unit 170 and the access request according to the second protocol output from the memory controller 120 to outside based on the selection result in the selection unit 170.

Figure 4:
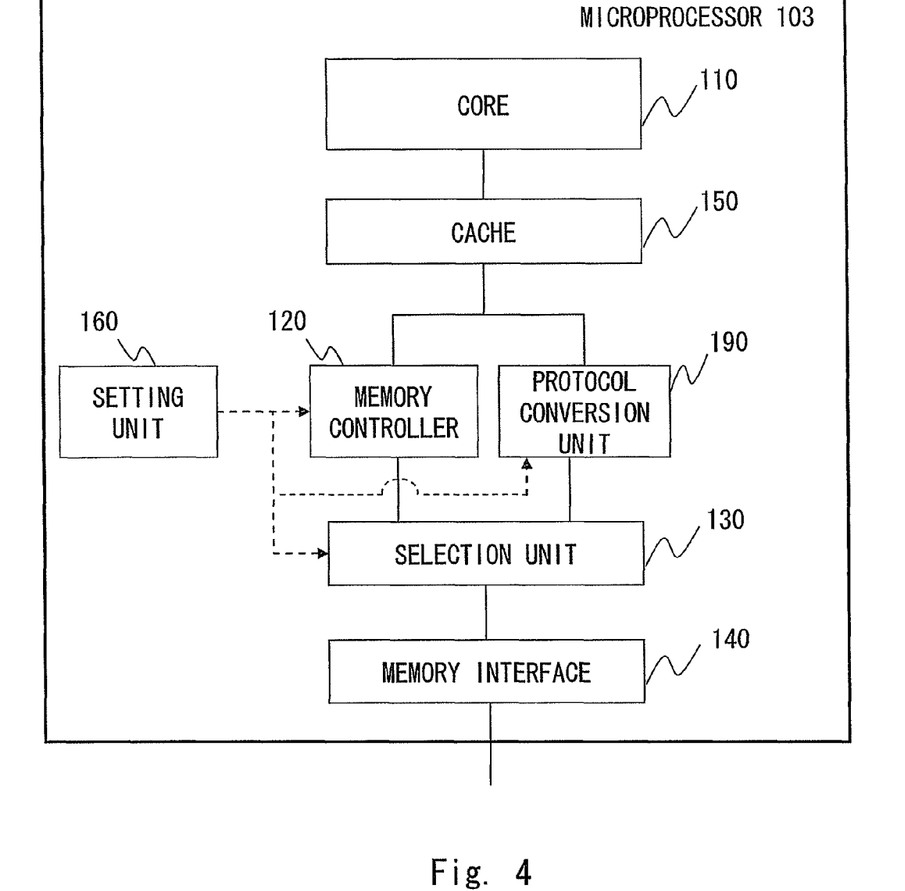
FIG. 4 is a block diagram of another form of the microprocessor according to the first exemplary embodiment.

Further, as shown in FIG. 4, a protocol conversion unit 190 may be additionally provided between the cache 150 and the selection unit 130. The protocol conversion unit 190 receives the access request according to the first protocol output from the cache 150, converts the access request to an access request according to a third protocol, and outputs the access request to the selection unit 130. The third protocol here is a dedicated protocol specified to communicate with a relay apparatus connected to the memory interface 140. The protocol conversion unit 190 converts the access request output from the cache 150 to the protocol specified in the communication with the relay apparatus to output the access request based on the protocol used in the communication inside the microprocessor 103. The selection unit 130 selects one of the memory controller 120 and the protocol conversion unit 190 as the connection destination of the memory interface 140 based on the control signal input from the setting unit 160. According to this selection, one of the access request according to the second protocol output from the selection unit 130 and the access request according to the third protocol is externally output from the memory interface 140. When the selection unit 130 connects the protocol conversion unit 190 and the memory interface 140, a relay apparatus is arranged between the microprocessor and the external memory. The relay apparatus receives the access request according to the third protocol. Then, the memory controller arranged inside the relay apparatus converts the access request to an access request according to the second protocol, and accesses the external memory.

Further, the setting unit 160 may output the control signal to stop each function of the memory controller 120 and the protocol conversion unit 190 to each of the memory controller 120 and the protocol conversion unit 190 based on the setting information regarding whether to use the memory controller 120. The memory controller 120 or the protocol conversion unit 190 that receives the control signal from the setting unit 160 stops its operation. Alternatively, the cache control unit in the cache 150 may include the conversion function in the protocol conversion unit 190. When the output destination of the access request is set to the selection unit by the setting unit 160, the cache control unit may generate the access request according to the third protocol, and output the access request to the selection unit 130.

Second Exemplary Embodiment

A computer system according to a second exemplary embodiment has a multi-processor configuration in which a microprocessor included in the system includes a plurality of cores, a plurality of memory controllers, and a plurality of memory interfaces. Hereinafter, the computer system according to the second exemplary embodiment will be described with reference to the drawings.

Figure 5:
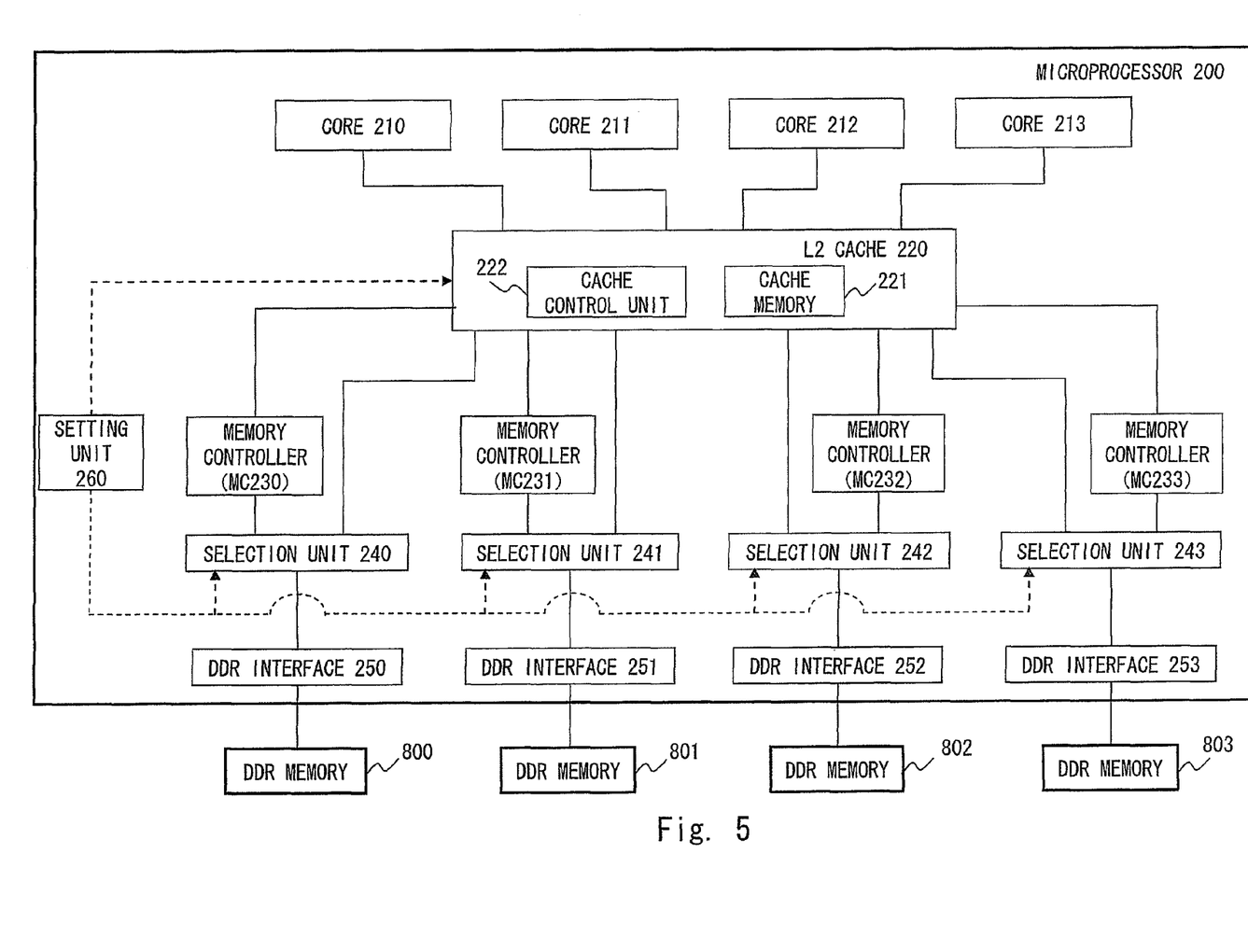
FIG. 5 is a block diagram of a computer system according to a second exemplary embodiment.

FIG. 5 is a block diagram showing a configuration of the computer system according to the second exemplary embodiment. The computer system includes a microprocessor including a plurality of memory interfaces, relay apparatuses or external memories connected to the memory interfaces. FIG. 5 shows a case in which external memories are directly connected to the plurality of memory interfaces included in the microprocessor 200. Further, external memories connected to the microprocessor 200 are DDR memories, and the memory interfaces included in the microprocessor 200 are DDR interfaces. The DDR memory here means an SDRAM using a Double-Data-Rate (DDR) system, and the DDR system here also includes a standard of DDR2 and the following standards. Further, the DDR interface is an interface to connect the microprocessor and the SDRAM of the above DDR system, and is an interface that satisfies the electrical specification specified by the standard of DDR. The DDR memories are mounted in a package called a DIMM in a typical computer.

The microprocessor 200 includes four cores (cores 210 to 213), an L2 cache 220, four memory controllers (MCs 230 to 233), four selection units (240 to 243), four DDR interfaces (DDR interfaces 250 to 253), and a setting unit 260. The memory controllers, the selection units, and the DDR interfaces are arranged in sets. Hereinafter, the memory controller is abbreviated as MC. Further, description of the same parts as those in the first exemplary embodiment are partially omitted.

The cores 210 to 213 each decodes an instruction that is fetched, and performs various controls and operations according to the content of the instruction. The cores 210 to 213 each includes an instruction/data cache that temporarily stores the instruction or data that is frequently accessed, instruction pipelines to perform pipeline processing, and a computing unit that performs various operations. Although the number of cores is four in the second exemplary embodiment, it is not limited thereto. In recent years, the number of cores in the microprocessor has been increasing, and may be any number of one or more.

The L2 cache 220 temporarily stores the data required by the cores 210 to 213. The L2 cache 220 mainly includes a cache memory 221 and a cache control unit 222. The cache memory 221 is a temporal storage unit that temporarily stores instructions or data that are frequently accessed by the cores 210 to 213. The cache control unit 222 performs a control to read out required instructions or data from the cache memory 221 or a control to write required instructions or data to the cache memory 221 according to the access request that is input.

Further, the cache control unit 222 receives data sent back from the MCs 230 to 233 or the selection units 240 to 243, and writes received data to the cache memory 221. The cache memory is typically divided into several banks therein and typically has a set associative configuration. The similar cache memory may be employed also in the present invention. It is desired in this configuration that the cache memory has four banks or more and at least has a four-way set associative configuration since the number of cores is four and four MCs are included. In the L2 cache 220 shown in FIG. 5, the cache memory 221 is divided into four banks and has a four-way set associative configuration.

The MCs 230 to 233 perform the access control to DDR memories 800 to 803 connected to the DDR interfaces 250 to 253 according to the protocol specified by the DDR standard. Note that the DDR standard includes DDR, DDR2, DDR3, DDR4, and each MC has a control function to control all or a part of the DDR memory including the subsequent standard of the DDR. Specifically, the MCs 230 to 233 each receives the access request from the cache control unit 222 and outputs the access request according to the protocol specified by the DDR standard corresponding to the DDR memories 800 to 803 connected to the DDR interfaces 250 to 253. The MCs 230 to 233 each outputs the data read out from the DDR memory to the cache control unit 222 which is the request source. Although the microprocessor 200 includes four memory controllers in FIG. 5, it is not limited to this. The number of memory controllers may be any number of one or more according to the number of channels required by the memory, and may be varied as appropriate.

The selection units 240 to 243 are arranged to form pairs with the MCs 230 to 233, and select whether to access the external memories using the MCs 230 to 233. Specifically, the selection units 240 to 243 select one of the access request according to the first protocol output from the cache control unit 222 and the access request according to the second protocol output from the MCs 230 to 233 to output the selected one to the DDR interfaces 250 to 253. Specifically, the selection units 240 to 243 select one of the cache control unit 222 and the MCs 230 to 233 as the connection destination of the DDR interfaces 250 to 253. In other words, when accessing the external memory with the use of the MCs 230 to 233, the selection units 240 to 243 connect inputs/outputs of the MCs 230 to 233 and the memory interfaces 250 to 253. On the other hand, when the access request output from the cache control unit 222 is directly output to outside without the use of the MCs 230 to 233, the selection units 240 to 243 connect the input/output of the cache control unit 222 and the DDR interfaces 250 to 253. When the selection units 240 to 243 connect the DDR interfaces 250 to 253 and the cache control unit 222, relay apparatuses or the like including external memory controllers are connected to the DDR interfaces 250 to 253.

The DDR interfaces 250 to 253 are interfaces that connect the microprocessor 200 and the DDR memories, and its specification is specified according to the standard of the DDR memories connected thereto. The DDR interfaces 250 to 253 may satisfy all or a part of the electrical specification such as DDR, DDR2, DDR3, DDR4. Further, they may be supported by subsequent DDR interfaces after DDR4. The DDR interfaces 250 to 253 are connected to the corresponding selection units 240 to 243, externally output signals input from the selection units 240 to 243, and output signals input from outside to the selection units 240 to 243. In summary, the memory interfaces 250 to 253 externally output one of the access request according to the first protocol and the access request according to the second protocol that is selected by the selection units 240 to 243. Although FIG. 5 shows a case in which the microprocessor 200 includes four DDR interfaces, it is not limited thereto. The number of DDR interfaces may be changed according to the requirement of a memory amount and bandwidth.

The setting unit 260 refers to setting information including setting whether to use the MCs 230 to 233 to perform setting of the cache control unit 222 and the selection units 240 to 243. Specifically, the setting unit 260 refers to the above setting information, and outputs the control signal according to the content to the cache control unit 222 and the selection units 240 to 243. The cache control unit 222 sets the output destination of the access request to one of the memory controllers and the selection units based on the control signal input from the setting unit 260, and outputs the access request to the output destination that is set. Further, the selection units 240 to 243 select the corresponding connection destination of the DDR interfaces from any one of the memory controllers 230 to 233 and the cache control unit 222 based on the control signal input from the setting unit 260. The setting information referred to by the setting unit 260 may be stored inside the microprocessor 200 or may be stored in an external ROM.

Described next is an operation of the computer system shown in FIG. 5.

First, a case will be described in which the core 210 among the plurality of cores 210 to 213 accesses the L2 cache 220, resulting in a cache miss in the L2 cache.

The core 210 executes instructions shown in Table 1.

TABLE 1

| | |
|---|---|
| MOV | R2, 128 |
| MOV | R3, 256 |
| LD | R1, R2, R3 |

By executing MOV instructions, the core 210 sets a register R2 in the core 210 to 128, a register R3 to 256. By executing an LD instruction, the core 210 loads data from the address of 384, which is the sum of the values of R2 and R3, and reads out the data in a register R1.

The core 210 includes a data cache therein, and determines cache hit/cache miss in the internal data cache. The core 210 reads out the corresponding data from the internal data cache in the case of a cache hit. On the other hand, in the case of a miss hit, the core 210 outputs a data reading request to read out the corresponding data to the L2 cache 220.

The L2 cache 220 determines hit/miss as a typical cache memory. Upon receiving the data reading request from the core 210, the cache control unit 222 in the L2 cache 220 determines whether the corresponding data is stored in the cache memory 221. In the case of a cache hit, the cache control unit 222 reads out the cache data stored in the cache memory 221 in a unit of cache line, and outputs the cache data to the core 210 of the request source. The cache line here is a data management unit of the cache memory, and typically has a size of about 64 bytes to 256 bytes. On the other hand, in the case of a cache miss, the cache control unit 222 outputs the data reading request. The output destination of the reading request is determined based on the setting performed by the setting unit 260 and a predetermined memory interleave rule.

The setting unit 260 refers to the setting information including setting regarding whether to use the MCs 230 to 233 to set the output destination of the cache control unit 222. The setting information is shown in Table 2.

TABLE 2

| Address condition | Interleave destination |
| --- | --- |
| Remainder of division of address in 256 is 0 to 63 | To MC 230 or selection unit 240 |
| Remainder of division of address in 256 is 64 to 127 | To MC 231 or selection unit 241 |
| Remainder of division of address in 256 is 128 to 191 | To MC 232 or selection unit 242 |
| Remainder of division of address in 256 is 192 to 255 | To MC 233 or selection unit 243 |

In the case shown in Table 2, all the MCs 230 to 233 are set to be used. Thus, the cache control unit 222 outputs the data reading request to the MCs 230 to 233, not to the selection units 240 to 243.

Next, one example of the memory interleave rule is shown in Table 3.

TABLE 3

| MC 230 availability bit | 1 | (Available) |
| MC 231 availability bit | 1 | (Available) |
| MC 232 availability bit | 1 | (Available) |
| MC 233 availability bit | 1 | (Available) |

The memory address is interleaved for a unit of 64 bytes, which is the size of the cache line, according to the rules shown in Table 3. In other words, data of one address is stored in the DDR memory connected to one of the MCs 230 to 233 or the DDR memory connected to the relay apparatus for a unit of 64 bytes. In this example, the LD instruction in Table 1 is the access to the address 384, and the remainder of division in 256 is 128. Thus, it corresponds to the MC 232 or the selection unit 242 according to the rule shown in Table 2. On the other hand, according to the setting information stated above, the MC 232 is set to be used in place of the selection unit 242. Thus, the data reading request which is the request of the cache miss to the address 384 occurred in the L2 cache 220 is sent to the MC 232.

Table 4 shows one example of a packet sent from the L2 cache control unit 222 to the MC 232.

TABLE 4

| 1 bit | 2bit | 40bit | 8bit | 8bit |
| --- | --- | --- | --- | --- |
| 1 | 00 | 384 | LOAD | 0 |
| Effective bit | Output source core number | Access address | Command | Tag number |

The packet includes an effective bit, an output source core number, an access address, a command, and a tag number. The effective bit is one-bit information indicating whether the packet is effective. The output source core number is information indicating the core that outputs the cache request. The access address is address information indicating a logic address of the data to be accessed. The command is information indicating the content of the access request. The tag number is information allocated for tag management. Further, the L2 cache control unit 222 outputs a snoop request to other processors that may be connected to the microprocessor 200 as required.

The MC 232 receives the packet, specifies the DDR memory storing the target data using an internal table, and sends the DDR command to the selection unit 242.

The selection unit 242 selects whether to send the DDR command for memory access output from the MC 232 to the DDR interface 252 or to directly send the command from the cache control unit 222 to the DDR interface 252 based on the setting performed by the setting unit 260. In Table 2, the MC 232 is set to be used according to the setting information. Thus, the DDR command output from the MC 232 is sent to the DDR interface 252. In short, the packet output from the memory controller 232 is sent to the DDR memory 802 through the selection unit 242 and the DDR interface 252.

The DDR memory 802 sends back the 64-byte data stored in itself to the DDR interface 252 according to the command sent from the DDR interface 252. The data that is sent back has a reply format of a typical DDR. The data is sent back to the memory controller 232 through the DDR interface 252 and the selection unit 242. The memory controller 232 re-constructs the 64-byte data, and sends back the data to the cache control unit 222 in the form of the packet shown in Table 5.

TABLE 5

| 1 bit | 2bit | 64 byte-width data | 8bit | 8bit |
|---|---|---|---|---|
| 1 | 00 | DATA | LOAD | 0 |
| Effective bit | Return destination Core number | Return data | Command | Tag number |

The packet includes an effective bit, a return destination core number, return data, a command, and a tag number. The effective bit is one-bit information indicating whether the packet is effective. The output source core number is information indicating the core that outputs the original cache request. The return data is data read out from the memory. The command is information indicating the content of the command of the original request. The tag number is information allocated for tag management.

The cache control unit 222 registers data part included in the packet that is sent back in the cache memory 221. Otherwise, the cache control unit 222 determines the output source that outputs the original request from the packet without registering the data part. In this case, the return destination core number shown in the packet is 00, which indicates the core 210. Thus, the data is sent back to the core 210. The cache control unit 222 manages the address of the cache request issued by itself by a tag number, and refers to the tag number included in the reply data, thereby capable of acquiring the address of the data that is sent back. The 64-byte data that is sent back from the L2 cache 220 is registered in the data cache in the core 210, and only the data which is in the address of 384 that is required is retrieved, which is stored in the register R1. According to the series of operations shown above, the operation of the sequence of instructions shown in Table 1 is completed.

The store operation is performed in a similar way as the load operation. In short, the command data is sent or received as appropriate in the cache control unit 222, the memory controllers 230 to 233, and the selection units 240 to 243 based on the setting performed by the setting unit 260.

Figure 6:
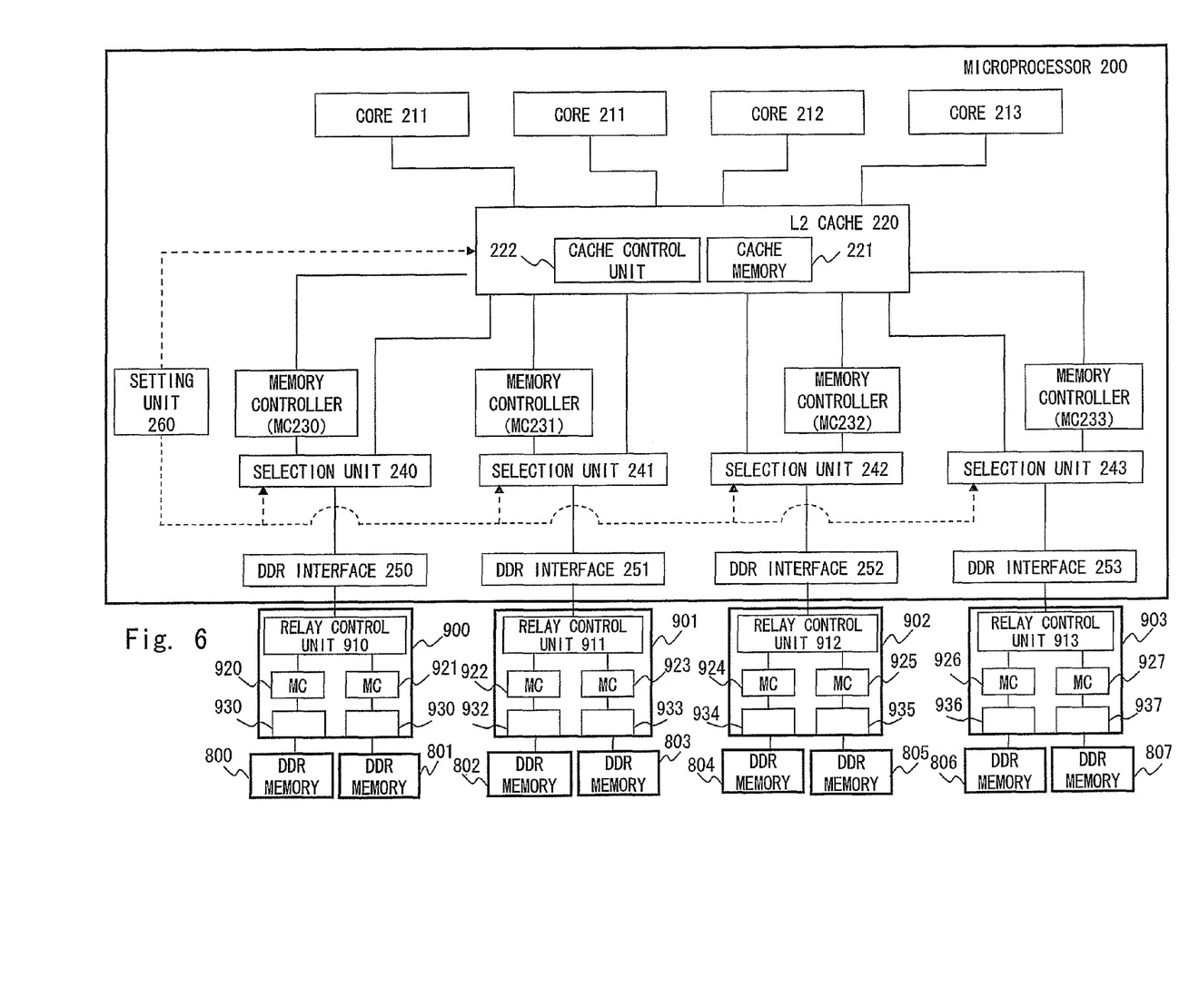
FIG. 6 is a block diagram of the computer system according to the second exemplary embodiment.

Next, the operation of executing the sequence of instructions shown in Table 1 in the configuration shown in FIG. 6 will be described. In FIG. 6, DDR memories 800 to 807 are connected to the microprocessor 200 through relay apparatuses 900 to 903. Each relay apparatus includes a memory controller, and the memory controller operates as an external memory controller for the microprocessor 200. Accordingly, in this connection configuration, the MCs 230 to 233 provided inside the microprocessor 200 are not used. The setting information in the connection configuration in FIG. 6 is shown in Table 6.

TABLE 6

| MC 230 availability bit | 0 | (Unavailable) |
|---|---|---|
| MC 231 availability bit | 0 | (Unavailable) |
| MC 232 availability bit | 0 | (Unavailable) |
| MC 233 availability bit | 0 | (Unavailable) |

In the case shown in Table 6, all the MCs 230 to 233 are not used. Therefore, the data reading request is output to the selection units 240 to 243, not to the MCs 230 to 233.

Described in this example is, as is similar to the above case, the operation in which the core 210 accesses the L2 cache 220, resulting in a cache miss in the L2 cache.

The core 210 executes the instructions shown in Table 1. By executing the MOV instructions, the core 210 sets 128 in the register R2 and 256 in the register R3 in the core 210. By executing the LD instruction, the core 210 loads data from the address of 384, which is the sum of the values of R2 and R3, and reads the loaded data to the register R1.

The core 210 determines cache hit/cache miss in the internal data cache. In the case of a cache hit, the core 210 reads out the corresponding data from the internal data cache. On the other hand, in the case of a miss hit, the core 210 outputs the data reading request to the L2 cache 220 to read out the corresponding data.

Upon receiving the data reading request from the core 210, the cache control unit 222 in the L2 cache 220 determines whether the corresponding data is stored in the cache memory 221. In the case of a cache hit, the cache control unit 222 reads out the cache data stored in the cache memory 221 in a unit of cache line, and outputs the cache data to the core 210 which is the request source. On the other hand, in the case of a cache miss, the cache control unit 222 outputs the data reading request which is a request of cache miss to the selection unit 242 based on the setting information and the memory interleave rule.

The selection unit 242 directly sends the data reading request received from the cache control unit 222 to the DDR interface 252. Thus, the data reading request output from the cache control unit 222 is directly sent to the relay apparatus 902 through the DDR interface 252. Accordingly, the cache control unit 222 generates a command packet so as to be able to directly use the DDR interface 252 to output the command packet to the selection unit 242.

The relay apparatus 902 is relay means to connect the microprocessor 200 and the DDR memory, and includes memory controllers 924 and 925, DDR interfaces 934 and 935, and a relay control unit 912 therein. Although described here is a configuration in which two memory controllers and two DDR interfaces are arranged in the relay apparatus, it is not limited thereto. The relay apparatus may include one memory controller and one DDR interface. Alternatively, three or more memory controllers and three or more DDR interfaces may be mounted.

The relay control unit 912 receives the command packet output from the DDR interface 252 of the microprocessor 200 through an interface (not shown), and selects the memory controller that connects the external memory storing the target data. For example, the relay control unit 912 refers to the management table shown in Table 7 to specify the memory controller of the output destination from the access address included in the command packet.

TABLE 7

| Lower 9th-bit of address 0 | To memory controller 924 |
|---|---|
| Lower 9th-bit of address 1 | To memory controller 925 |

In the above example, the access address included in the command packet is 384. Accordingly, the memory controller 924 is selected according to the management table shown in Table 7, and the corresponding command packet is sent to the memory controller 924.

The memory controller 924 performs an access control to the DDR memory connected to the DDR interface 934. The memory controller 924 is provided outside the microprocessor 200. Upon receiving the command packet from the relay control unit 912, the memory controller 924 specifies the DRAM storing the data requested from the command packet using the management table included in itself, and sends the command for memory control to the external memory.

The DDR memory 804 reads out the 64-byte data stored therein according to the command passed through the DDR interface 934 from the memory controller 924, and sends the data back to the memory controller 924. The memory controller 924 sets the received data in the packet as shown in Table 5, and sends the packet to the microprocessor 200. This packet is sent back to the L2 cache 220 through the DDR interface 252 and the selection unit 242.

The cache control unit 222 in the L2 cache 220 registers the packet that is sent back in the cache memory 221. Otherwise, the cache control unit 222 determines the output source of the original request from the packet without registering the packet. In such a case, the output source core number included in the packet is 00, and thus the data is sent back to the core 210.

The 64-byte data that is sent back from the cache control unit 222 is registered in the data cache in the core 210. Then, only the data in the address of 384 that is required is retrieved, which is stored in the register R1. According to the above operation, the operation of the sequence of instructions shown in Table 1 is completed. Note that the store operation may be executed in the similar way.

In this way, by changing the content of setting information, the microprocessor according to the present invention can be operated with two or more kinds of memory configurations in a flexible way.

Figure 7:
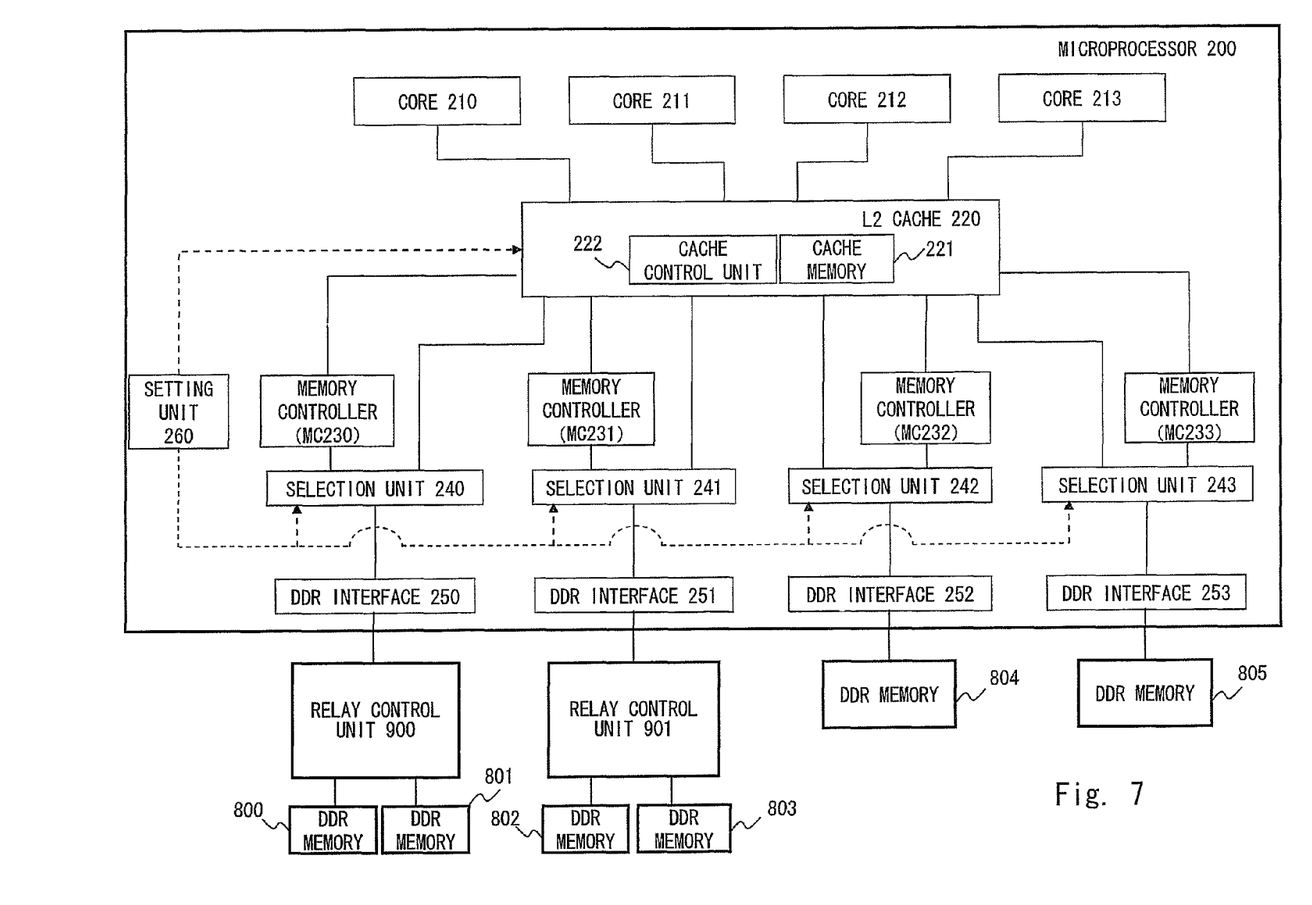
FIG. 7 is a block diagram of the computer system according to the second exemplary embodiment.

Although described above is a case in which all the MCs 230 to 233 in the microprocessor 200 are used or not used, it is not limited thereto. As shown in FIG. 7, only a part of the MCs included in the microprocessor 200 may be used. In this way, it is possible to use a high-speed memory area with short latency by direct connection with the microprocessor 200 and a memory area with long latency and high capacity by connection through a relay apparatus while combining them. The setting information in the configuration shown in FIG. 7 is as shown in Table 8.

TABLE 8

| | | |
|---|---|---|
| MC 230 availability bit | 0 | (Unavailable) |
| MC 231 availability bit | 0 | (Unavailable) |
| MC 232 availability bit | 1 | (Available) |
| MC 233 availability bit | 1 | (Available) |

Note that the present invention is not limited to the exemplary embodiments stated above, but may be changed as appropriate without departing from the spirit of the present invention. For example, while explained above is the configuration in which the setting unit 160 and the setting unit 260 are arranged inside the microprocessor, the setting units may be arranged outside the microprocessor. In this way, it may be possible to appropriately select whether to use the embedded memory controller upon receiving the control signal from the setting unit arranged outside of the microprocessor.

Figure 8:
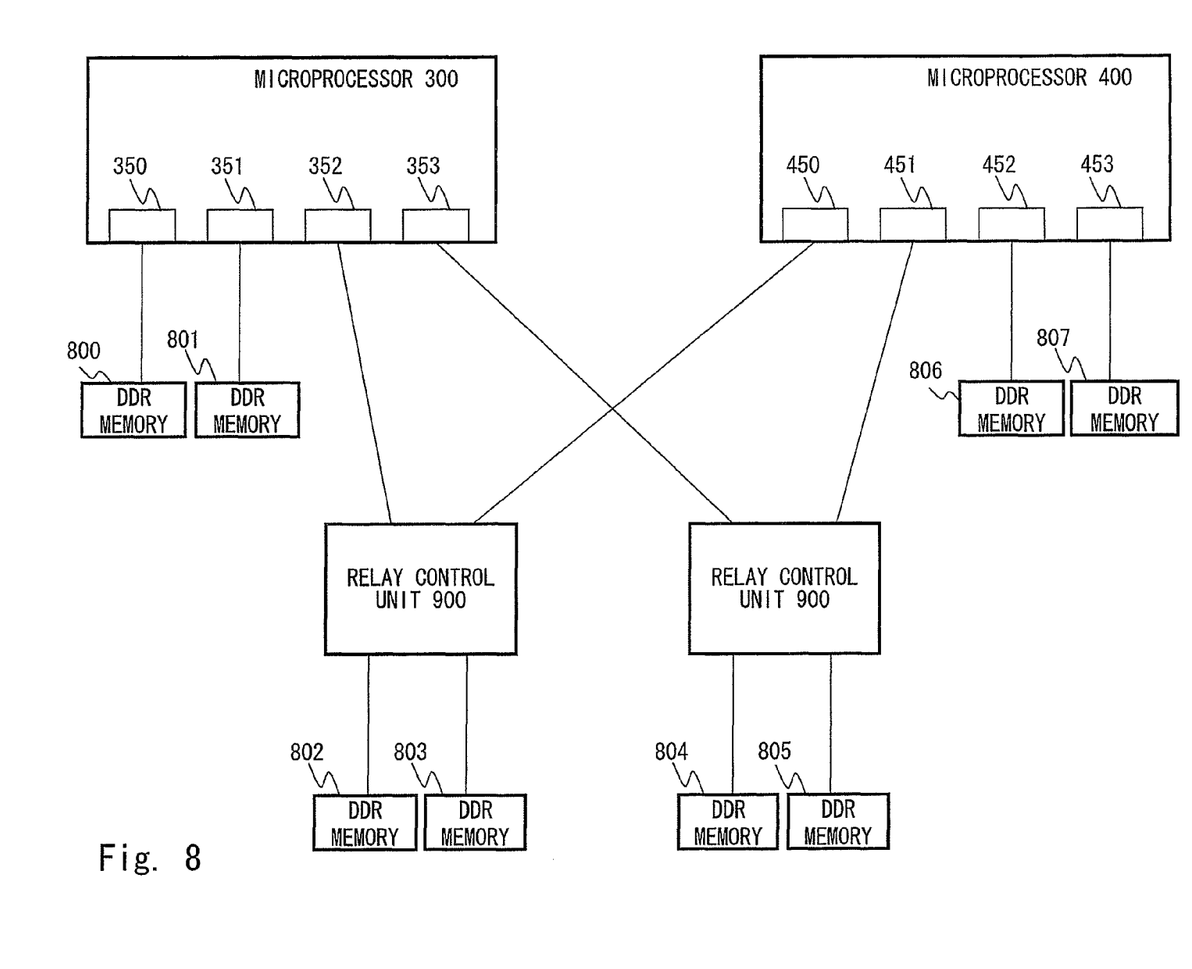
FIG. 8 is a block diagram of the computer system according to the second exemplary embodiment.

Further, the computer system may be formed as shown in FIG. 8. In this computer system, a configuration is shown in which two microprocessors 300 and 400 having the same configuration as that of the microprocessor described above share relay apparatuses 900 and 901.

In the microprocessor 300, embedded MCs corresponding to DDR interfaces 350 and 351 are used, and embedded MCs corresponding to DDR interfaces 352 and 353 are not used. Further, in the microprocessor 400, embedded MCs corresponding to DDR interfaces 450 and 451 are not used, and embedded MCs corresponding to the DDR interfaces 452 and 453 are used. Then, the DDR interface 352 and the DDR interface 450 are connected to the relay apparatus 900, and the DDR interface 353 and the DDR interface 451 are connected to the relay apparatus 901. Accordingly, DDR memories 802 to 805 connected to the relay apparatus 900 or 901 can be shared by the microprocessors 300 to 400. According to the configuration, it is possible to employ a hybrid configuration in which a high-speed local memory area with short latency by direct connection with the microprocessor and a large-scale shared memory area with large latency and high capacity that can be shared with other processors by connection through the relay means are used while combining them.

Moreover, according to the present invention, the following configuration can be employed.

(1) A microprocessor including: instruction execution unit that executes an instruction to output an access request to a memory according to a first protocol; memory control unit that converts the access request according to the first protocol to an access request according to a second protocol to perform an access control to an external memory to output the access request; selection unit that selects whether to access the external memory using the memory control unit; and interface unit that externally outputs one of the access request according to the first protocol and the access request according to the second protocol based on the selection result in the selection unit.

(2) The microprocessor according to (1), in which the selection unit selects one of the access request according to the first protocol output from the instruction execution unit and the access request according to the second protocol output from the memory control unit to output the selected one to the interface unit.

(3) The microprocessor according to (1), further including: temporal storage unit that temporarily stores data which is frequently accessed by the instruction execution unit; and cache control unit that performs a control to read out required data from the temporal storage unit or a control to write required data into the temporal storage unit based on the access request received from the instruction execution unit; in which the cache control unit outputs the access request received from the instruction execution unit to one of the memory control unit and the selection unit according to the first protocol.

(4) The microprocessor according to (3), further including setting unit that refers to setting information including setting regarding whether to use the memory control unit to control the selection performed by the selection unit.

(5) The microprocessor according to (4), in which the setting unit refers to the setting information including setting regarding whether to use the memory control unit to control an output destination of the access request output from the cache control unit according to the first protocol.

(6) The microprocessor according to (4), in which the setting unit performs a control to stop an operation of the memory control unit when the setting information indicates that the memory control unit is not used.

(7) The microprocessor according to (5), in which the instruction execution unit includes a plurality of instruction execution units, the memory control unit includes a plurality of memory control units, the selection unit includes a plurality of selection units, and the interface unit includes a plurality of interface units, and the cache control unit determines the output destination of the access request output according to the first protocol based on the control performed by the setting unit, address information included in the access request input from the instruction execution unit, and a predetermined memory interleave rule.

(8) The microprocessor according to (3), in which the interface unit is an interface to connect a Dynamic Random Access Memory (DRAM) of Double-Data-Rate (DDR) system, and the memory control unit outputs the access request to perform the access control to the DRAM according to a protocol specified by the DDR system based on the access request output from the cache control unit.

(9) The microprocessor according to (3), further including protocol conversion unit that receives the access request according to the first protocol output from the cache control unit to output an access request according to a third protocol, in which the selection unit selects one of the access request according to the second protocol output from the memory control unit and the access request according to the third protocol output from the protocol conversion unit to output the selected one to the interface unit, and the interface unit externally outputs one of the access request according to the second protocol and the access request according to the third protocol based on the selection result in the selection unit.

(10) A memory access method used by a microprocessor including a memory control unit that performs an access control to an external memory, the method including: a setting step that sets whether to use the memory control unit; an instruction execution step that executes an instruction to output an access request to a memory according to a first protocol; a conversion step that converts the access request according to the first protocol to an access request according to a second protocol to perform the access control to the external memory when it is set in the setting step that the memory control unit is used, and does not perform the conversion when it is set in the setting step that the memory control unit is not used; and an output step that selects one of the access request according to the first protocol and the access request according to the second protocol to externally output the selected one.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A microprocessor comprising:
   an instruction execution unit that executes an instruction to output an access request to a memory according to a first protocol;
   a memory control unit that converts the access request according to the first protocol to an access request according to a second protocol to perform an access control to an external memory to output the access request;
   a selection unit that selects whether to access the external memory using the memory control unit; and
   an interface unit that externally outputs one of the access request according to the first protocol and the access request according to the second protocol based on the selection result in the selection unit.

2. The microprocessor according to claim 1, wherein the selection unit selects one of the access request according to the first protocol output from the instruction execution unit and the access request according to the second protocol output from the memory control unit to output the selected one to the interface unit.

3. The microprocessor according to claim 1, further comprising:
   a temporal storage unit that temporarily stores data which is frequently accessed by the instruction execution unit; and
   a cache control unit that performs a control to read out required data from the temporal storage unit or a control to write required data into the temporal storage unit based on the access request received from the instruction execution unit;
   wherein the cache control unit outputs the access request received from the instruction execution unit to one of the memory control unit and the selection unit according to the first protocol.

4. The microprocessor according to claim 3, further comprising a setting unit that refers to setting information including setting regarding whether to use the memory control unit to control the selection performed by the selection unit.

5. The microprocessor according to claim 4, wherein the setting unit refers to the setting information including setting regarding whether to use the memory control unit to control an output destination of the access request output from the cache control unit according to the first protocol.

6. The microprocessor according to claim 4, wherein the setting unit performs a control to stop an operation of the memory control unit when the setting information indicates that the memory control unit is not used.

7. The microprocessor according to claim 5, wherein
   the instruction execution unit comprises a plurality of instruction execution units, the memory control unit comprises a plurality of memory control units, the selection unit comprises a plurality of selection units, and the interface unit comprises a plurality of interface units, and
   the cache control unit determines the output destination of the access request output according to the first protocol based on the control performed by the setting unit, address information included in the access request input from the instruction execution unit, and a predetermined memory interleave rule.

8. The microprocessor according to claim 6, wherein
   the interface unit is an interface to connect a dynamic random access memory (DRAM) of double-data-rate (DDR) system, and
   the memory control unit outputs the access request to perform the access control to the DRAM according to a protocol specified by the DDR system based on the access request output from the cache control unit.

9. The microprocessor according to claim 3, further comprising a protocol conversion unit that receives the access request according to the first protocol output from the cache control unit to output an access request according to a third protocol, wherein
   the selection unit selects one of the access request according to the second protocol output from the memory control unit and the access request according to the third protocol output from the protocol conversion unit to output the selected one to the interface unit, and
   the interface unit externally outputs one of the access request according to the second protocol and the access request according to the third protocol based on the selection result in the selection unit.

10. A memory access method used by a microprocessor comprising a memory control unit that performs an access control to an external memory, the method comprising:
   a setting step that sets whether to use the memory control unit;
   an instruction execution step that executes an instruction to output an access request to a memory according to a first protocol;
   a conversion step that converts the access request according to the first protocol to an access request according to a second protocol to perform the access control to the external memory when it is set in the setting step that the memory control unit is used, and does not perform the conversion when it is set in the setting step that the memory control unit is not used; and
   an output step that selects one of the access request according to the first protocol and the access request according to the second protocol to externally output the selected one.

* * * * *